G. W. BARTH.
APPARATUS FOR ROASTING GRAINS AND SEEDS.
APPLICATION FILED AUG. 3, 1908.
937,914.
Patented Oct. 26, 1909.
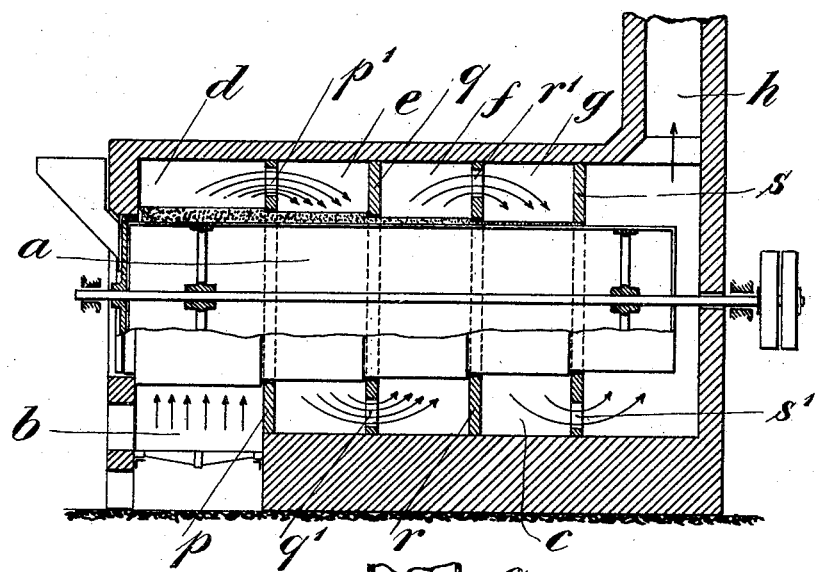
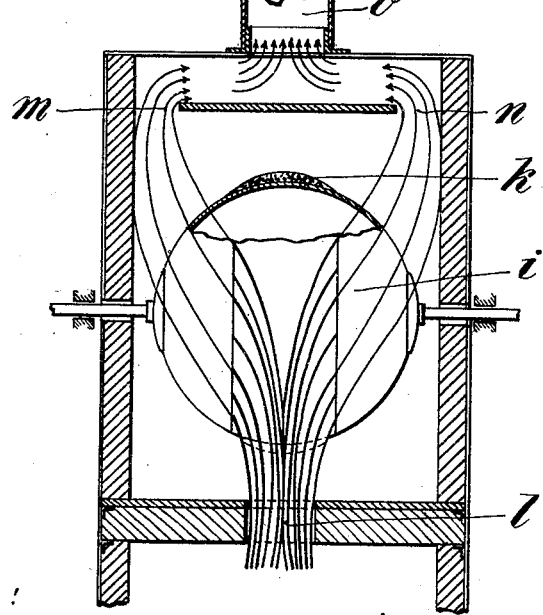
Witnesses:
L. Lang
L. Walkman
Inventor:
Georg Wilhelm Barth
by B. Singer
atty.

UNITED STATES PATENT OFFICE.

GEORG WILHELM BARTH, OF LUDWIGSBURG, GERMANY.

APPARATUS FOR ROASTING GRAINS AND SEEDS.

937,914.

Specification of Letters Patent.   Patented Oct. 26, 1909.

Application filed August 3, 1908.   Serial No. 446,616.

*To all whom it may concern:*

Be it known that I, GEORG WILHELM BARTH, a citizen of the German Empire, residing at Ludwigsburg, in the Kingdom of Würtemberg, have invented certain new and useful Improvements in Apparatus for Roasting Grains and Seeds; and I do hereby declare the following to be a full, clear, and exact description of the invention, such as will enable others skilled in the art to which it appertains to make and use the same.

My invention relates to improvements in apparatus for roasting grains and seeds, and more particularly coffee beans. And the object of the improvements is to provide an apparatus of this class, whereby the grains or seeds are uniformly roasted. For this purpose, the apparatus consists of a receptacle adapted to receive the grains or seeds and made up of wall sections of different conductivity for heat, the heating gases being successively supplied to the said wall sections from that of the lowest conductivity to that of the highest conductivity. Therefore, the heating gases, when at their highest temperature, will come in contact with the wall sections of lowest conductivity, whereupon, after being cooled off to some extent, they come in contact with a section of higher conductivity, and so on, until they escape from the apparatus. Therefore, the heat transmitted to the receptacle will be approximately uniform.

For the purpose of explaining the invention, I have shown several examples embodying the same in the accompanying drawing, in which the same letters of reference have been used in all the views to indicate corresponding parts.

In said drawing, Figure 1, is a longitudinal section of a roasting apparatus with the receptacle receiving the grain or seed partly in side view, and Fig. 2, is a similar section showing a modification of the apparatus.

Referring now particularly to the example illustrated in Fig. 1, the receptacle for receiving the grain or seed consists of a drum $a$ of slightly conical shape. Below the said drum, and at one side thereof, I provide a passage $b$ for admitting the heating gases, the fire place being shown, in the example illustrated, as located directly within the said passage. The drum is located within a heating chamber $c$ divided into separate chambers $d$, $e$, $f$, $g$ by partition walls $p$, $q$, $r$, $s$. The said chambers communicate with each other through passages $p'$, $q'$, $r'$, $s'$ provided in the partition walls and displaced relatively to each other in successive walls. From the passage or fire place $b$ the heating gases pass into the first chamber $d$ and around the section of the drum $a$ extending therethrough. Through the opening $p'$ provided in the upper part of the first partition wall, they get into the second chamber $e$, within which they move downward and through the opening $q'$ provided in the lower part of the second partition wall $q$ and into the third chamber $f$, and so on, until, after passing through all the chambers, they are discharged into the chimney $h$. The section of the drum extending through the first part $d$ of the heating chamber has a wall of low conductivity for heat, for which purpose it may be provided with a cover of asbestos. Within said chamber part of the heat passes through the wall of the drum section. The section of the drum which extends through the second chamber $e$ is likewise provided with a wall of low conductivity, the latter, however, being somewhat higher than that of the first section, because the temperature of the heating gases has already been decreased. In this section again part of the heat passes through the wall of the drum section so as to be transmitted to the grain or seed, whereupon the gases pass into the next heating chamber $e$, and so on, the conductivity of the walls of the drum sections being successively increased as the temperature of the gases decreases, so that the drum section extending through the last chamber is without any cover, and the gases are in direct contact with the metal of the wall. This can be done without any injury to the wall, because the temperature of the gases has been considerably decreased.

Evidently, by providing walls of suitable conductivity in the successive drum sections the amount of heat transmitted to the various sections and to the grain or seed can be made uniform, also if the drum is very large.

In Fig. 2, I have shown an apparatus in which the receptacle for the grain has spherical form. The gases are admitted through a channel $l$. Where they first strike the roasting drum $i$, that is, in the example illustrated, at the central part thereof, it is surrounded by a beltlike covering $k$ of insulating material. By means of a plate $p$ located above the roasting drum and having lateral openings m and n connecting the lower part of the heating chamber with the flue, the heating gases are directed to the right and left of the chamber, whereby part of the heat is transmitted through the central part of the wall of the drum, whereupon the gases are gradually deflected to the right and left hand portions of the drum, where the decreased heat can be transmitted to the drum without injuring the wall thereof, or without unduly heating the grain.

While, in describing the invention, I have referred to particular means for decreasing the conductivity of the successive wall sections of the drum, I wish it to be understood, that my invention is not limited to the means shown, and that other means may be used for the same purpose.

I claim:

1. In an apparatus for roasting grains or seeds, the combination of a rotary drum having partly an outer cover of different conductivity for heat, a furnace surrounding said drum, and a heating device below the portion of lowest conductivity of the cover, as and for the purpose specified.

2. In an apparatus for roasting grains or seeds, the combination of a rotary drum having partly an outer cover of sections of different conductivity for heat, a furnace surrounding said drum, a heating device below the section of lowest conductivity, and means for conducting the heating gases along the drum, as and for the purpose specified.

3. In an apparatus for roasting grains or seeds, the combination of a rotary drum having partly an outer cover of sections of different conductivity for heat, a furnace surrounding said drum, a heating device below the section of lowest conductivity, and partition walls for conducting the heating gases along the drum, as and for the purpose specified.

4. A grain roaster comprising in combination, a rotatable grain containing member having a hollow interior for the grain, the wall of said member having a section of relatively low heat conductivity and being graduated to a section of high heat conductivity, means for directing hot gases to the exterior of the section of lowest conductivity, and means for guiding the gases about the exterior of said member throughout the length of said sections.

5. A grain roaster comprising in combination, a cylindrical rotatable grain containing member having a hollow interior for the grain of uniform size throughout the length thereof, the wall of said member having a section of relatively low heat conductivity graduated to a section of high heat conductivity, means for directing hot gases to the exterior of the section of lowest conductivity, and means for guiding gases about the exterior of said member throughout the length of said sections.

6. A grain roaster comprising in combination, a horizontally disposed cylinder having a hollow interior for the grain of uniform size throughout, the wall of said cylinder having a section of relatively low heat conductivity and being graduated to sections of high heat conductivity, a burner delivering the products of combustion to the exterior of the section of lowest conductivity, a furnace closing said cylinder and provided with an outlet adjacent the section of highest heat conductivity, and partition walls dividing the space surrounding said cylinder into separate compartments, said walls being provided with openings arranged in zigzag order to provide a suffusious route for the products of combustion.

In testimony whereof I hereunto affix my signature in the presence of two witnesses.

GEORG WILHELM BARTH.

Witnesses:
SIGMUND ROEIDLINGER,
PAUL LEONHARDT.